United States Patent [19]
Bunten

[11] 3,868,474
[45] Feb. 25, 1975

[54] TERMINAL ENCLOSURE AND EXTENSION THEREFOR

[75] Inventor: Theodore M. Bunten, Rydal, Pa.

[73] Assignee: Repco Products Corporation, Philadelphia, Pa.

[22] Filed: Oct. 19, 1973

[21] Appl. No.: 408,206

[52] U.S. Cl................................... 174/38, 174/60
[51] Int. Cl.............................................. H02g 9/02
[58] Field of Search ....... 174/38, 57, 60, 68 C, 100, 174/101, 68 B; 220/3.94, 4 A, 8

[56] References Cited
UNITED STATES PATENTS

| | | |
|---|---|---|
| 2,350,601 | 6/1944 | Frank et al..................... 174/68 B X |
| 2,916,539 | 12/1959 | Hamilton............................. 174/38 |
| 3,033,912 | 5/1962 | Phillips................................ 174/38 |
| 3,164,668 | 1/1965 | Skubal........................... 174/38 UX |
| 3,404,212 | 10/1968 | Mack et al............................ 174/38 |
| 3,485,932 | 12/1969 | Van Schaack........................ 174/38 |
| 3,538,236 | 11/1970 | Baumgartner........................ 174/38 |
| 3,740,452 | 6/1973 | Bunten................................. 174/38 |
| 3,761,780 | 9/1973 | Plummer.......................... 174/38 X |

Primary Examiner—Laramie E. Askin
Attorney, Agent, or Firm—Seidel, Gonda & Goldhammer

[57] ABSTRACT

A terminal enclosure for electrical wires and electrical devices is provided with an extension to facilitate supporting the enclosure at a higher elevation when required by the conditions of the surrounding terrain.

7 Claims, 3 Drawing Figures

PATENTED FEB 25 1975 3,868,474
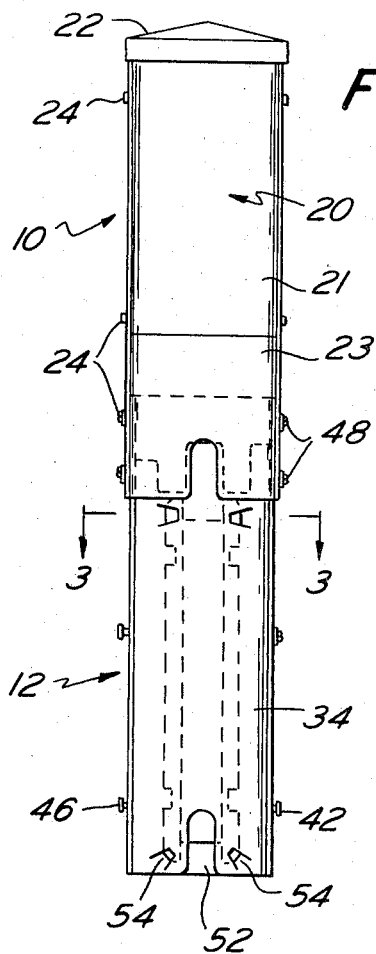
FIG.1
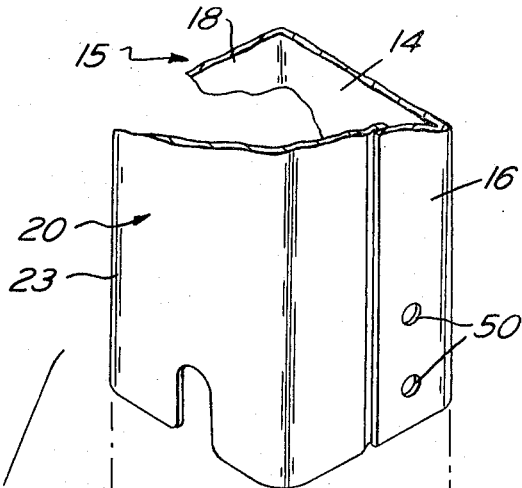
FIG.2
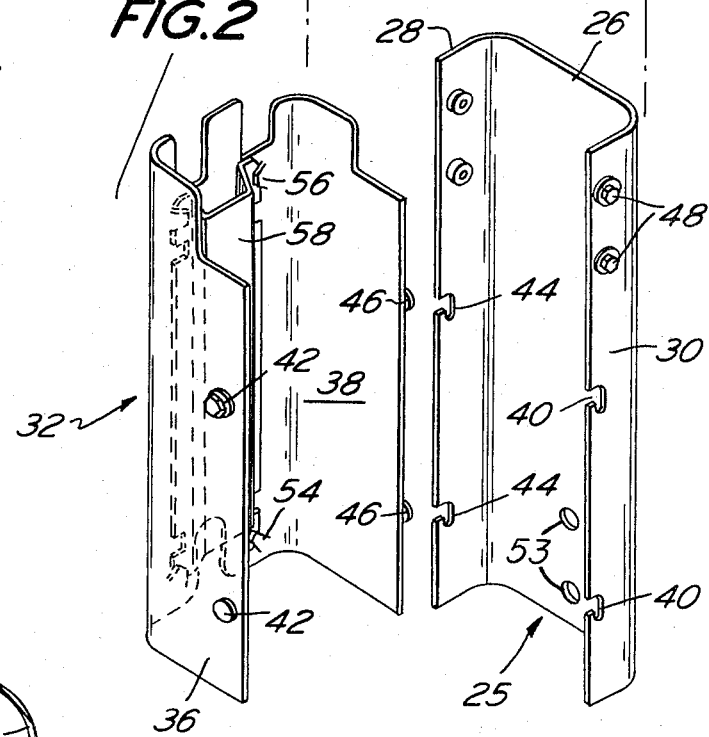
FIG.3
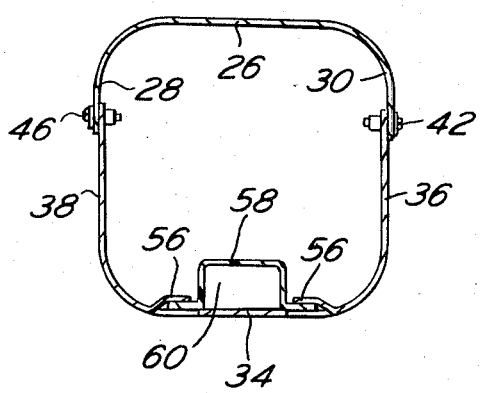

TERMINAL ENCLOSURE AND EXTENSION THEREFOR

The present invention is directed to a situation which presents a problem to utility companies who use terminal enclosures. Such terminal enclosures are particularly adapted for use by telephone companies for enclosing assigned and unassigned conductors which enter and exit from the open bottom end of the enclosure. The enclosure is adapted to be mounted in the ground with its top end several feet above ground level.

In some rural areas where such enclosures are installed, it is difficult for a lineman to locate the enclosure due to high grass and other growth surrounding the enclosure. Due to lack of visibility in high growth on farms, the enclosures are struck by farm equipment which frequently cuts the cable. In other areas, the wetness of the terrain or the susceptibility to high snow drifts makes it desirable to support the enclosure several feet higher than the length of the enclosure would normally permit. It is uneconomical to produce enclosures of various lengths since the need for the longer enclosure is not a sufficiently large enough quantity for economical production. Further, storing enclosures of different lengths presents a warehousing problem for users or distributors of the enclosures.

In accordance with the present invention, a conventional enclosure is provided with an extension adapted to be at least partially imbedded in the terrain with the upper end of the extension being connected to the lower or bottom end of the enclosure. In this manner, the enclosure will be supported at an elevation 1 to 3 feet higher than normal.

The extension is preferably of the same general cross section as the enclosure. The extension includes a rear member which removably supports thereon a front member. Means are provided on the rear member to facilitate rigidly joining the rear member of the extension to the rear member of the enclosure. If desired, the extension may be of different lengths.

It is an object of the present invention to provide an extension for a terminal enclosure.

It is another object of the present invention to provide an extension which is compatible in cross-section with an enclosure for supporting the enclosure at a higher elevation so that it may be more easily located under adverse terrain conditions.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a front elevation view of an enclosure mounted on an extension.

FIG. 2 is a partial perspective view of the enclosure and an exploded illustration of the extension.

FIG. 3 is a sectional view taken along the line 3—3 in FIG. 1.

Referring to the drawing in detail, wherein like numerals indicate like elements, there is shown in FIG. 1 an enclosure designated generally as 10 mounted on an extension in accordance with the present invention and designated generally as 12. The enclosure 10 may be of the type shown in U.S. Pat. No. 3,740,452 and the disclosure therein is incorporated herein by reference.

The enclosure 10 includes a rear member 15 having a rear wall 14 and side flanges 16 and 18. A front member 20, which may be comprised of discrete sections 21 and 23, is removably supported by the flanges 16 and 18. The enclosure 10 includes a top member 22. The front member 20 is removably supported on the rear member 15 in any convenient manner such as by support means 24 which permits complete removal of the front member 20 to thereby expose conductors, terminals, and other electrical devices housed therewithin and supported by said member 15.

The extension 12 is preferably of the same general cross-sectional configuration as the enclosure 10. Extension 12 includes a rear member 25 having a rear wall 26 and side flanges 28 and 30. A front member 32 is provided and includes a front wall 34 having side flanges 36 and 38. The front member 32 is removably supported by the rear member 25 in any suitable manner.

As illustrated in FIG. 2, the structure for removably supporting front member 32 on the rear member 25 includes notches 40 and 44 on the flanges 30 and 28 respectively. The front member flange 36 is provided with studs 42 adapted to be received in notches 40. The front member flange 38 is provided with studs 46 adapted to be received in the notches 44.

The extension rear member 25 is rigidly coupled to the enclosure rear member 15. To facilitate such coupling of the rear members, the rear member 25 on the extension 12 is longer than the front member 32 as shown in FIGS. 1 and 2. Adjacent the upper end of the extension rear member 25, there are provided holes to receive bolts 48 adapted to be coupled through the holes 50 in flange 16. Similar bolts and holes are provided to facilitate coupling the flange 28 to the flange 18. During installation, the rear member 25 on the extension 12 is anchored to the ground. Thereafter, the rear member 15 on the enclosure 10 is rigidly secured thereto by way of the bolts 48 and holes 50. Thereafter, the wiring, conductors, terminals, and other devices are mounted on the rear member 15. Then the front members 20, 32 are attached to their respective rear members 15 and 25.

The front member 32 is preferably provided with a centrally disposed notch 52 at its lower end on the front wall 34. Pairs of tabs 54 and 56 are struck out of the front wall 34 and bent so as to receive the side flanges on a channel member 58. The channel member 58 may be made from a polymeric plastic material such as polypropylene. As shown more clearly in FIG. 1, the tabs 54 are disposed at approximately a 45° angle with respect to the bottom edge of the front wall 34 so as to act as a limit stop for the channel member 58.

The channel member 58 is removably supported on the inner surface of the front wall 34 and may be removed only by sliding the same in an upward direction. The channel member 58 cooperates with the inner surface on the front wall 34 to define a channel 60 which is contiguous with the notch 52. The channel 60 is adapted to receive conductors which are entering in or exiting from the enclosure 10. In the event that the enclosure or its extension are damaged due to a storm or are hit by a vehicle, replacement of the enclosure and/or extension are facilitated without cutting the wires or conductors due to the removability of the channel member 58.

The extension 12 may be made in one or two sizes. Where the terrain requires the same, the extension will be utilized. As illustrated, the extension is preferably telescoped into the bottom end of the enclosure 10. In order that this may be accomplished, the extension 12 has substantially the same cross-section as the enclosure 10 but is slightly smaller in all transverse dimensions. When the enclosure 10 is installed on extension 12, the front member 20 overlaps the upper end of extension front member 32 so as to prevent the front member 32 from being disengaged with respect to its rear member 25. Thus, in order to remove the front member 32, it will be necessary to first remove the front member 20.

When enclosure 10 is supported by extension 12, the extension 12 is connected to a conventional mounting post (not shown) by means of holes 53. When no extension 12 is needed or desired, enclosure 10 may be connected to its mounting post in any convenient manner such as by means of holes 50. As shown in FIG. 2, holes 50 are disposed one above the other and holes 53 are disposed one above the other.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus comprising an extension for a terminal enclosure, said extension being open at each end, said extension including a rear member cooperating with a front member to form a hollow housing, said rear member being longer than said front member, flange means on said rear member removably supporting said front member, a channel member juxtaposed to the inner surface of said front member and cooperating therewith to define an enclosed channel, means removably securing said channel member to said front member, and means adjacent one end of said rear member for facilitating attachment of said rear member to a mating portion of a terminal enclosure.

2. Apparatus in accordance with claim 1 wherein said means removably securing said channel member to said front member includes tabs struck from the wall of said front member, said tabs overlying a flange on said channel member.

3. Apparatus in accordance with claim 1 including a notch at one end of said front member, said notch being contiguous to said channel.

4. Apparatus in accordance with claim 1 wherein said extension is generally rectangular in cross-section, said rear member having side flanges projecting from a rear wall towards said front member, said front member having a pair of side flanges projecting towards the rear wall on said rear member, and said flanges on said rear member constituting said flange means.

5. Apparatus comprising a terminal enclosure adapted to contain wires and devices for supporting wires, said enclosure including a rear member having side flanges and a front member removably supported by said flanges, said enclosure being closed at its top end and open at its bottom end, a detachable extension for said enclosure, said extension including a rear member having side flanges and a front member removably supported by said last mentioned flanges, a channel member juxtaposed to the inner surface of the extension front member to form a channel therewith, means removably securing said channel member to said extension front member, and means attaching the top end of said extension rear member to the bottom end of said enclosure rear member.

6. Apparatus comprising a terminal enclosure adapted to contain wires, said enclosure including a rear member having side flanges and a front member removably supported by said flanges, said enclosure being closed at its top end and open at its bottom end, said enclosure having mounting means including at least one hole adjacent the bottom end thereof for removably attaching the enclosure to support structure, a detachable extension for extending the length of and for removably supporting said enclosure, said extension including a rear member having side flanges and a front member removably supported by said last mentioned flanges, said extension being open at each end, the top end of said extension being telescoped with respect to the bottom end of said enclosure, means removably attaching the top end of said extension rear member to the bottom end of said enclosure rear member, said attaching means including at least one hole in said extension rear member aligned with a mating hole of said enclosure mounting means and a removable securing means extending through the aligned holes, a mounting means adjacent the bottom end of said extension for removably attaching said extension to support structure, whereby said enclosure is selectively mounted directly on support structure or indirectly mounted on support structure by way of said extension.

7. Apparatus in accordance with claim 6 wherein said extension rear member is longer than said extension front member, the lower ends of said extension members being at the same elevation, and said extension mounting means including at least one hole in said extension rear member adjacent the bottom end thereof.

* * * * *